United States Patent
Clark (10) Patent No.: US 7,894,713 B1
(45) Date of Patent: Feb. 22, 2011

(54) BACKLIT PHOTOGRAPHY BACKGROUND SYSTEM AND METHOD

(76) Inventor: Jeremy S. Clark, 5184 Caldwell Mill Rd., Suite 204, Box 343, Birmingham, AL (US) 35244

( * ) Notice: Subject to any disclaimer, the term of this patent is extended or adjusted under 35 U.S.C. 154(b) by 15 days.

(21) Appl. No.: 12/348,670

(22) Filed: Jan. 5, 2009

Related U.S. Application Data (60) Provisional application No. 61/018,992, filed on Jan. 4, 2008.

(51) Int. Cl.
*G03B 15/00* (2006.01)
*G03B 15/02* (2006.01)

(52) U.S. Cl. .................................. 396/3; 396/4
(58) Field of Classification Search .................. 396/1, 396/3, 4; 352/88, 89
See application file for complete search history.

(56) References Cited

U.S. PATENT DOCUMENTS

| | | | |
|---|---|---|---|
| 3,039,357 A | 6/1962 | Eagle | |
| 3,665,828 A | 5/1972 | Reiter | |
| 3,967,301 A | 6/1976 | Corning | |
| 5,619,299 A | 4/1997 | Fleming-Schaub | |
| 5,953,542 A | 9/1999 | Fleming | |
| 6,106,124 A | 8/2000 | Tarsia | |
| 6,259,572 B1 | 7/2001 | Meyer, Jr. | |
| 6,508,171 B1* | 1/2003 | Georges | 101/483 |
| 7,164,462 B2 | 1/2007 | Lamarre | |
| 2005/0111841 A1 | 5/2005 | Geller | |
| 2006/0114356 A1 | 6/2006 | Didow et al. | |
| 2006/0137260 A1* | 6/2006 | Shernaman | 52/36.1 |
| 2008/0055880 A1* | 3/2008 | Williams et al. | 362/11 |
| 2008/0246777 A1* | 10/2008 | Swanson et al. | 345/640 |
| 2009/0056183 A1* | 3/2009 | Reiland et al. | 40/564 |

FOREIGN PATENT DOCUMENTS

JP 359121029 A 7/1984

OTHER PUBLICATIONS

Garry Edwards, "Photographic Studio Lighting", 4 pages found at http://www.photographers.co.uk/html/photographic-studio-lighting-2.cfm.

* cited by examiner

*Primary Examiner*—Rodney E Fuller
(74) *Attorney, Agent, or Firm*—Angela Holt; Lanier Ford Shaver & Payne P.C.

(57) ABSTRACT

A system and method for producing realistic backgrounds in studio photography is provided. The system comprises a background screen lit from behind by a light source. The background screen comprises a graphic screen upon which a high resolution image is printed. A filter screen behind the graphic screen is positioned substantially parallel to the graphic screen and separated from the graphic screen by a predetermined distance. The photography subject is placed in front of the graphic screen and pictures are taken. The diffusion of light through the filter screen onto the graphic screen results in highly realistic background images.

14 Claims, 5 Drawing Sheets

BACKLIT PHOTOGRAPHY BACKGROUND SYSTEM AND METHOD

CROSS REFERENCE TO RELATED APPLICATIONS

This application claims the benefit of provisional application No. 61/018,992, filed Jan. 4, 2008.

FIELD OF THE INVENTION

The present invention relates generally to backdrop fields used in studio photography, and more particularly relates to backlit photographic backgrounds or backdrops that are more vivid and realistic than conventional backgrounds.

BACKGROUND AND SUMMARY OF THE INVENTION

Providing a scenic background for studio photography is well known in the art using backdrop screens, but such screens do not provide a realistic background. The present invention improves upon the prior art by providing a system and method for high-resolution and highly realistic backdrops for studio photography.

Printed prior art backdrop screens for photography are printed using a direct printing process wherein a liquid ink is deposited directly on an opaque, reflective screen. While this type of printing works for reflective backdrops, direct printing does not work well for backlit displays or graphics because the ink used in direct printing tends to block light passing through a substrate upon which the ink is deposited.

In contrast, a dye sublimation process, when used in the present invention, heats a solid dye directly in contact with the media, converting the dye to a gas that diffuses directly into the media. Thus, while direct printing results in a layer of ink deposited on a surface of the substrate or media, dye sublimation printing actually fuses the dye colors into the media itself. Where the media or substrate is a plastic transparent or translucent material, the plastic itself becomes colored by the dye.

Figure 1:
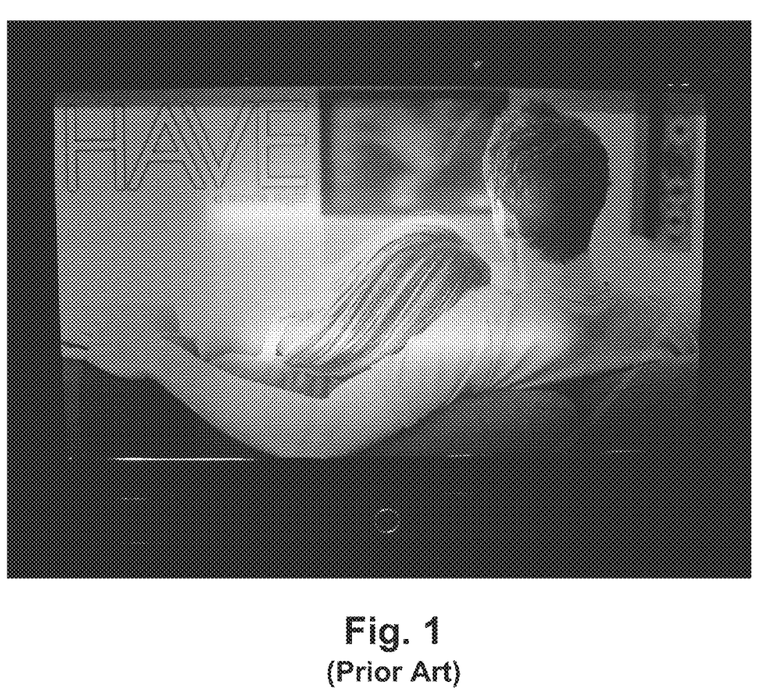
FIG. 1 is a photograph of a prior art backlit advertising sign printed using a dye sublimation process.

Dye sublimation printing is ideal for printing on large plastic sheet materials such as used in backlit commercial signage, plastic sheet banners and the like into which images are impressed and incorporated directly into the plastic sheet media by heat. However, such plastic sheet materials having dye sublimation-printed images such as those used for signage do not work well to produce realistic photographic backdrops, at least partially because these materials exhibit "hot spots" when backlit, and glare when illuminated from the front. By way of example, FIG. 1 shows an advertising sign of the prior art currently in use and printed using a dye sublimation process, and which clearly shows hot spots where two fluorescent tubes are illuminated behind the sign. It is thus readily apparent that such a combination of a backlit plastic sheet material with a graphic image printed using a dye sublimation process is unsuitable for a photographic backdrop.

To Applicant's knowledge, no photographic backdrop screens are currently produced using a dye sublimation process. Rather, direct printing is the preferred printing for producing backdrop screens, these screens producing the graphic image by reflection from the backdrop.

For purposes of summarizing the invention, certain aspects, advantages, and novel features of the invention are described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

Figure 2:
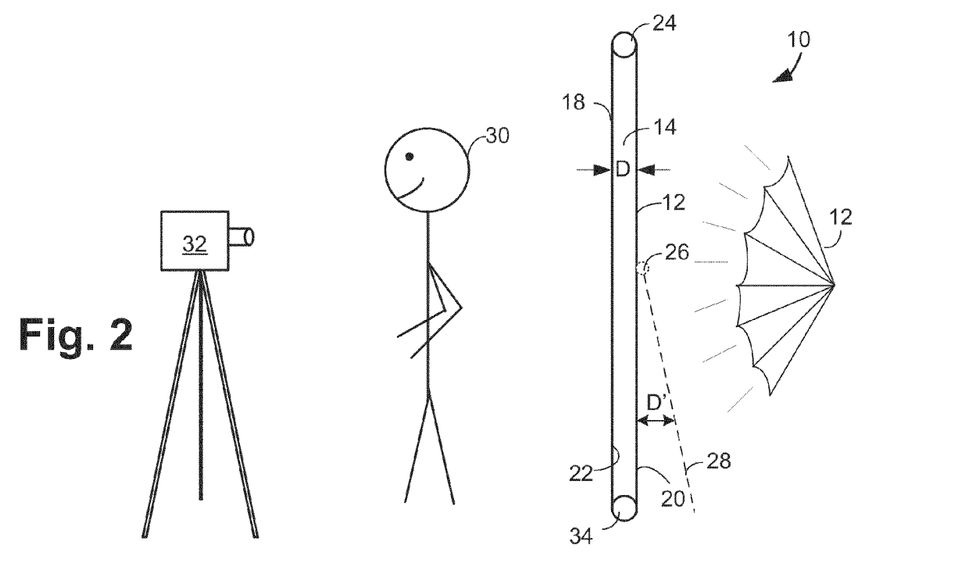
FIG. 2 depicts a side view of an exemplary system in accordance with the present disclosure.

As shown in FIG. 2, Applicant's photographic system comprises a backdrop screen assembly 10 illuminated from behind by one or more photographic light sources 12. For a typical studio photographic backdrop, the screen assembly may be about 8 feet tall and 10 feet wide, although other screen assembly sizes may be constructed. Here, a screen assembly having the described dimensions of 8 feet tall by 10 feet wide lends itself well to use of two backlights spaced about 3-5 feet from each other behind the screen assembly, although a smaller screen assembly may use a single backlight to direct light onto a center of the diffusion screen. A graphics backdrop screen 14 having a high resolution image 16 (FIG. 3) impressed therein on a front side 18 is mounted at a front of graphics screen assembly 10, and a diffusion screen 20 that may be the same size or substantially the same size as graphics screen 14 is positioned behind and spaced apart from a rear side 22 of graphics screen 14 by a predetermined distance or spacing.

The material of graphics screen 14 may be any of a number of translucent fabrics or sheet materials that pass light, and has the desirable properties of ability to transfer and diffuse light when backlit, light weight for ease of handling, wrinkle resistance, capability of receiving a dye sublimation image and accurately rendering the colors of the dyes. Materials that have been found to work well are relatively thin, neutral or white, translucent, commercially available synthetic fabrics that include at least some material that readily is colored by heated dyes used in dye sublimation printing. This material of the fabric that takes up sublimation dyes may be a thermoplastic material, such as polyester, polypropylene or combinations thereof, although other materials may be used. In some instances, a knit or knit-like fabric containing polyester, polypropylene or both may be used. Significantly, with sublimation dyes forming the high resolution image fused into the material of the graphics screen, when the graphics screen is uniformly illuminated from behind, the synthetic material of the fabric and sublimation dyes glow in a manner that imparts a realism to the graphics that is not achievable with conventional photographic backdrops.

Examples of some materials that are suitable or at least somewhat suitable for use with the instant invention are CELTIC CLOTH, commercially available from Sew What, Inc. in Los Angeles, Calif., and which is a 100% polyester material used as a stage backdrop. Another material available from Sew What is a heavy weight poly poplin material, although this material does not transmit light as well as other more suitable materials. As an example of a sheet material, Backlit Vinyl is available from Magic Vinyl Printing, in Westfield, Me. However, this material creates objectionable glare, is hard to handle and takes permanent creases. Similarly, a PVC sheet material available from Guangzhou Jin Run Digital Materials, Ltd., has similar problems, including creation of glare. Yet another material that is suitable is Eco-Janus, available from Dazian Fabrics, in Secaucus, N.J., but its high cost makes this material cost prohibitive for this application.

For providing an evenly distributed and uniform light source to rear side 22 of graphics screen 14, diffusion screen 20, as noted, is separated from rear side 22 of graphic screen 14 by a predetermined distance. Diffusion screen 20 is constructed of a light-colored, translucent sheet material that spreads light uniformly from one or more of light sources 12 generally across a width and breadth of diffusion screen 20, and passes the light so distributed to rear 22 of graphic screen 14. As such, diffusion screen 20 may be constructed from any of a number of materials that distribute and pass a sufficient amount of light from the one or more point sources of light to illuminate the graphics screen of the present invention. Here, it may be that translucent synthetic fabric materials that include polyester, polypropylene and combinations thereof make the best diffusion screens due to each thread of the fabric acting in a similar manner as a light waveguide to transmit and distribute light in directions across the diffusion screen generally perpendicular to a direction from which the light was emitted. In other words, the synthetic threads collectively serve to distribute light from the light sources directly behind the diffusion screen to regions of the diffusion screen away from the light sources. In some embodiments, the graphics screen and diffusion screen may be constructed of the same material.

The distance of separation between graphics screen 14 and diffusion screen 20 may range between distances where the diffusion screen may be almost touching a rear side of the graphics screen, such as ¼ inch or so, or the diffusion screen may be spaced up to several inches to a foot or two from rear side 22 of the graphics screen. Here, 1¼ inches is a spacing that has been found to work well in photographic studio settings.

Figure 3:
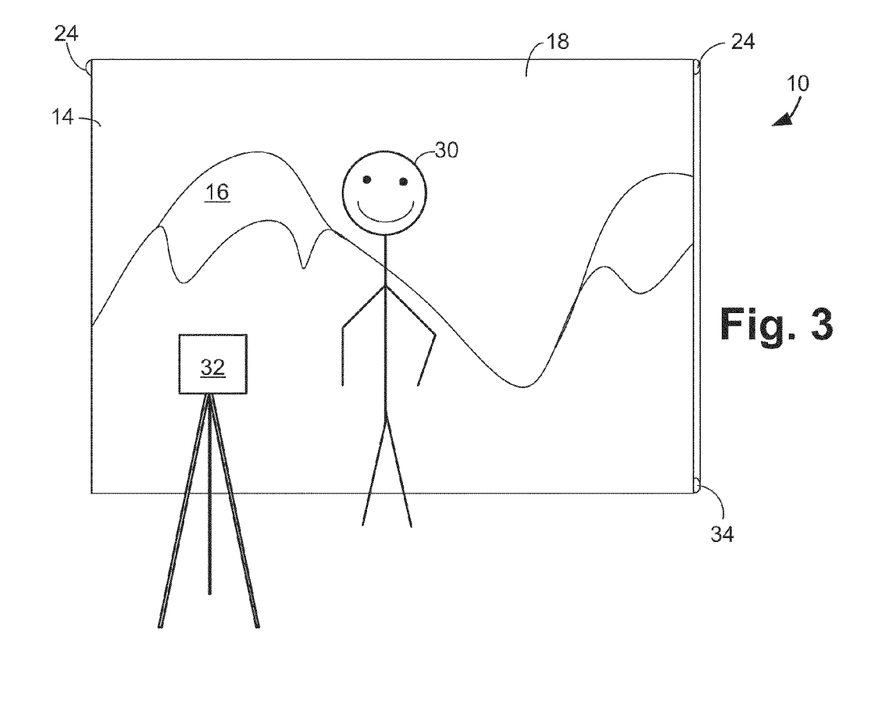
FIG. 3 depicts a front perspective view of the exemplary system illustrated in FIG. 2.

In order to achieve the particular spacing between the graphics screen and diffusion screen, one or more spacers or spacing devices, which may be in the form of dowels, rods, tubes, bars or other members having a uniform width along their length, may be provided along at least a top edge of the graphics screen and diffusion screen. As shown in FIGS. 2 and 3, such a spacing member may take the form of a tube or rod member 24 having a diameter of 1¼ inches that extends completely across a top edge of screens 14 and 20, and provides support for the screens at their upper edges. Here, as shown in FIG. 2, graphics screen 14 passes over a front edge of member 24 and diffusion screen 20 passes over a rear edge of member 24, thus establishing a gap D of 1¼ inches between the graphic screen and the diffusion screen. As noted, in some embodiments such a gap may be the same across the width and breadth of the screens, or in other embodiments the gap may be selectively varied in particular areas or regions to achieve desired lighting effects of the graphics. Here, moving an area or region of the diffusion screen closer to the rear of the graphics screen causes somewhat more light to be passed through a corresponding area or region of the graphics screen, making the graphics in that area brighter, and moving an area or region of the diffusion screen further away from a rear of the graphics screen causes somewhat less light to be passed through that area of the graphics screen, making the corresponding graphics in that area darker. By way of example, and as shown in FIG. 2, a bar or rod 26 may be placed across the width of a rear of diffusion screen 20, and one portion of the diffusion screen, in this case a lower portion as shown by dashed line 28, may be displaced from spacing D to effect a different spacing D'. Thus, the lower region of graphics corresponding to spacing D' would be somewhat darker than the graphics corresponding to spacing D. As should be apparent, displacement of the diffusion screen need not be completely across the screen; such displacement either toward or away from a rear 22 of the graphics screen may be made at points or areas as desired to enhance graphics 16. In another embodiment, spacing between upper and lower edges of the screens may be different, to selectively lighten or darken upper and lower portions of the graphics screen.

At a bottom of graphics screen 14 and diffusion screen 20, a second tubular member 34 may be used to maintain spacing D, with a lower edge of graphics screen 14 passing as shown under a front edge of member 34 and a lower edge of diffusion screen 20 passing as shown under a rear edge of member 34. Thus, where lower member 34 is 1¼ inches in diameter, i.e. the same diameter as upper member 24 in the above example, and the screens are stretched taut between the upper and lower members 24 and 34, the spacing of 1¼ inches is maintained across the width and breadth of screens 14 and 20. While a lower member 34 identical to or substantially identical to upper member 24 is disclosed for maintaining spacing D, other ways of maintaining the spacing between screens 14 and 20 may be used. For instance, spacing D may be maintained by simply hanging screen 14 and screen 20 at the selected spacing. Weights may be attached to a lower edge of the screens to cause them to hang evenly at their selected spacing, and to stretch the screens taut. Such weights may take the form of a rod that is attached to and extends the length of a lower edge of a respective one of the graphics screen and diffusion screen in order to also lend rigidity to this lower edge, preventing the screen from developing vertical wrinkles. Likewise, a rigid rod, tube or bar may be attached to an upper edge of each of the screens in order to support the screen across its width. Such upper horizontal screen supports may in turn be supported by photographic screen stands as will be further described.

With respect to construction of graphic screen 14 and diffusion screen 20, where a gap between the screens is relatively small, perhaps up to about 4 inches or so, and as illustrated in FIG. 2, graphic screen 14 may be sewn to the diffusion screen 20 to form a seam (not shown) at respective top and bottom edges of the screens 14 and 20, connecting the graphics screen and diffusion screen together at their top and bottom edges. In this embodiment, and as noted, the spacing members 24 and 34 may be cylindrical rod or tube members that are inserted between the joined screens 14 and 20 at their top and bottom seams, with members 24 and 34 adjustably spaced vertically so as to stretch the screens taut. As such, the distance "D" in this embodiment is thus equal to the diameter of members 15 and 16. While attachment by sewing resulting in seams is disclosed, other attachments, such as bonding, may also be employed to attach the screens together. In other embodiments, both screens may be constructed from a rectangular contiguous sheet of material, and the free ends of the contiguous sheet attached at either the top or bottom of the respective screens by sewing, bonding or any other means for attaching these free ends together. Here, the dye sublimation image of the graphics is printed on one half of the contiguous sheet of material, with the diffusion screen formed from the other half of the contiguous sheet of material.

In some embodiments of the invention, screens 14 and 20 may each be integrated into a cylindrical screen cartridge under a spring bias wherein once the screens are pulled from the cartridges against the bias, the screens are retractable under the influence of the spring bias to roll themselves back into their respective cartridges. In these embodiments, the cartridges themselves may serve as spacers, with one screen cartridge being mounted at the upper end of the screen assembly and the other screen cartridge mounted at the lower end of the screen assembly. Free ends of the screens are provided with a rigid member, such as a rod, tube or bar, to provide rigidity across the free end of the screen. The spring bias applied to the deployed screens may serve to stretch the screens taut, maintaining the desired spacing between the graphics screen and diffuser screen. One or more attachment points may be provided on each of the cartridges for attaching a free end of the other screen, the attachment point or points spaced away from where a screen emerges from a respective cartridge a distance selected to maintain the desired spacing. Alternately, rather than screen cartridges, a self-retracting roll similar to that used for window blinds may similarly be used.

With respect to light source/sources 12, any light source may be used. Typically, for photography use, photographic strobe lights, tungsten lighting and fluorescent lighting may be employed to illuminate the subject as desired. In some instances, light modifiers such as umbrellas, direct flash and barn doors may be used.

In such a typical photographic studio application, the aforementioned 8 foot by 10 foot screen assembly may be illuminated by 2 strobe lights spaced 3-6 feet apart and about 5-10 feet away from a rear of the screen assembly to illuminate the rear of the screen assembly as a picture is taken. Such placement of light sources 12 causes the diffusion screen to become a uniform light source that evenly distributes light from the strobe lights to a rear of the graphics screen. In an exemplary embodiment, a front side of an 8 foot tall and 10 foot wide diffusion screen is illuminated from the rear by two strobe lights configured to emit 500 watts/second of light. The strobes are 6 feet 6 inches apart, and at a height of about 5 feet. The strobes are 6 feet from a rear of the diffusion screen. Light measurements made at the center and corners of the screen indicate a uniform F11 in this embodiment. In another embodiment, 2 photographic fluorescent lights are used to provide the equivalent of 1,800 watt/seconds. The spacing of the lights is 6 feet and 6 inches, and distance of the lights to the diffusion screen is 6 feet. Again, the diffusion screen is a light source producing a uniform F11 as measured at corners and a center of the diffusion screen. Such uniformity of light emission over the width and breadth of the diffusion screen, without hot spots and when used as a source of light for the graphics screen of the present invention, causes the graphics screen to appear more realistic than any backdrop screen of the prior art.

Figure 4:
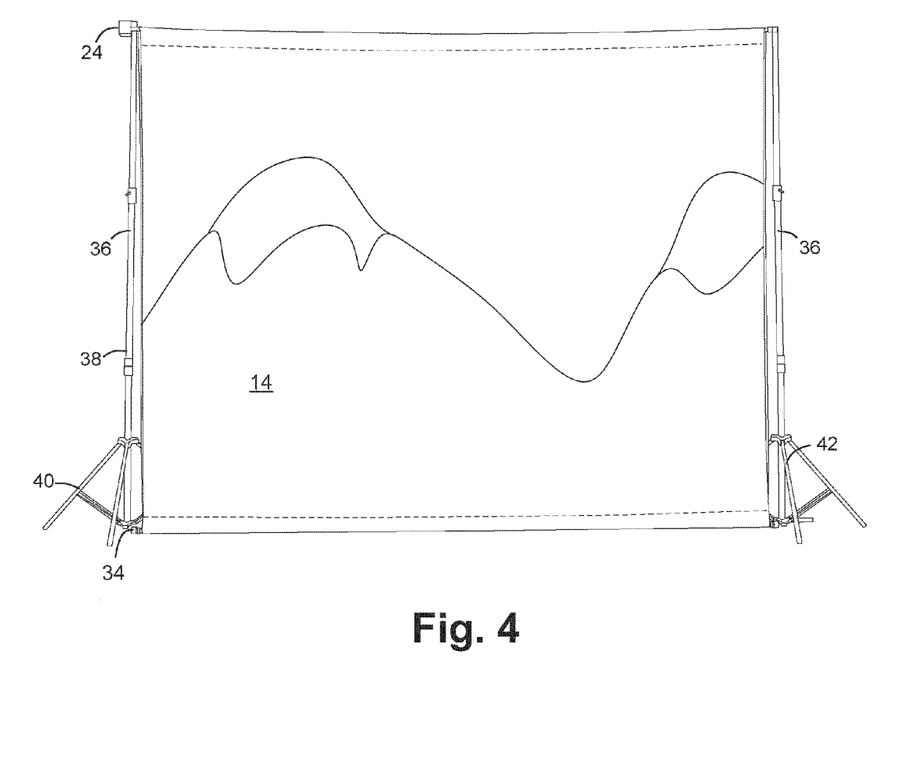
FIG. 4 depicts an enlarged view a lower corner of an exemplary background screen.

FIG. 4 is a front view of one embodiment of the screen assembly 10. In this embodiment, assembly 10 comprises a pair of conventional photographic screen support stands 36, one screen support stand 36 on each side of assembly 10. Each support stand 36 includes a vertical support 38 constructed having telescoping sections that telescope to collapse into a compact, portable size, and which are adjustable in height by tightening a locking member between each section. The support stands 36 further comprise lower tripod floor supports 40 and 42 that also collapse for portability. Upper member 24 extends between upper ends of the vertical supports 38, and is conventionally mounted to these upper ends, as by a wingnut threaded into each end of member 24, and an opening or slot at an upper end of a respective support 38 that engages the wingnut. Member 24 supports the graphic screen 14 and the diffusion screen 20 across their width and in spaced relation in the manner shown in FIG. 2.

Lower member 34 also extends as shown between vertical supports 38, and as noted, may be identical in diameter to support 24, and used to maintain a uniform gap between the screens. Member 34 also may serve as a weight for tensioning graphic screen 14 and diffusion screen 20. Where the screens are attached together at their upper and lower ends or are contiguous, upper member 24 may simply be placed in the loop between upper ends of the screens, and the screens hung from the loop, and lower member 34 may similarly be inserted in the loop between lower ends of the screens, with the weight of the lower member 34 tensioning the screen. As noted, members 24 and 34 may be retractable screen cartridges or retractable rollers into/onto which the screens may be retracted. In other embodiments, members 24 and 34 may simply be solid or hollow rods, with diffusion screen 20 and graphic screen 14 manually rolled or folded around a respective one of the rods. Here, two pairs of support stands would be used, one pair for the graphics screen and a second pair of screen stands for the diffusion screen. With this construction, the graphics screen and diffusion screen are independent of each other, and may be placed at any desired spacing, although the illuminated effect of graphic screen 14, begins to fall off beyond a spacing of about 2 feet or so. As such, 2 feet may be an upper limit to the spacing between the screens. Where the screens are constructed of a contiguous sheet of screen material, the contiguous length of material forming both the graphic screen and diffusion screen may be stored in a single cartridge, and a tube or rod of a selected width provided to divide the graphics screen and diffusion screen. One of the rod and cartridge is mounted at upper ends of the screen support stands, and the other of the rod and cartridge mounted or positioned at a lower end of the screen support stands. In this embodiment, the rod and cartridge maintain the desired spacing between the screens.

Figure 5:
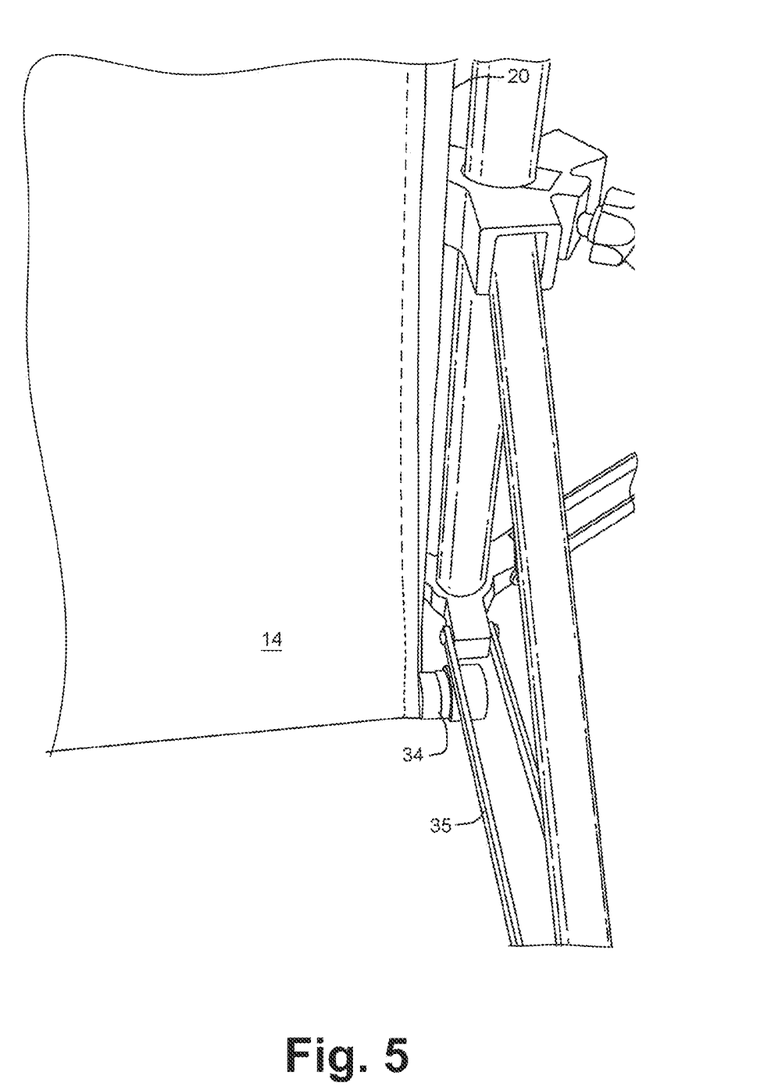
FIG. 5 depicts an exemplary background screen and support stand.

FIG. 5 illustrates an enlarged view of a tripod portion of a screen support stand of FIG. 4. Where graphic screen 14 and diffusion screen 20 are joined at each end and a lower member 34 is used, member 34 may simply hang free at a bottom of the tripod portion to maintain the desired spacing, or each end of member 34 may be positioned under one of the tripod supports 35 for that end. Here, telescoping sections of vertical supports 38 may be adjusted vertically so that the screen are taut, and locked in place by the locking members between the sections. In embodiments such as where a larger spacing is desired, such as from about 6 inches or so to about 2 feet, separate photographic screen stands may be used for the graphics screen and diffusion screen, with a rod or bar at upper and lower ends of each of the screens to provide rigidity to the upper and lower ends of the screens. Alternately, lower edges of the screens may be attached to objects on a floor, as by elastic or nonelastic cords, or to tiedown points in or on a floor surface.

Figure 6:
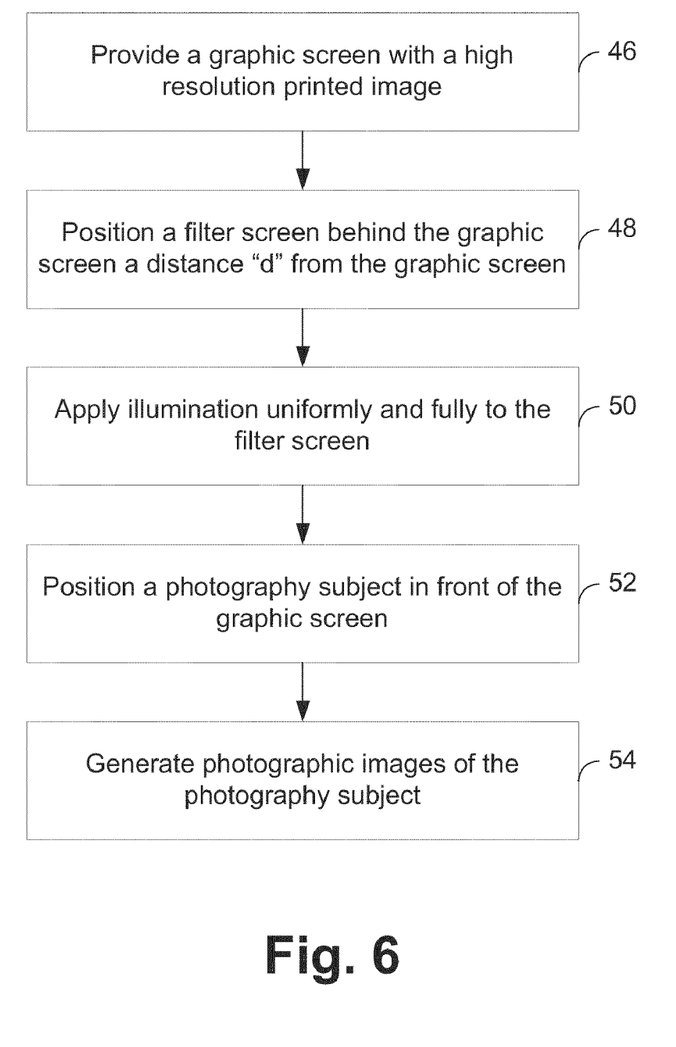
FIG. 6 depicts an exemplary method in accordance with the present disclosure.

FIG. 6 illustrates a method in accordance with an exemplary embodiment of the disclosure. According to step 46, graphic screen 14 is provided with a high resolution image on its surface, with sublimation dye printing being one preferred printing method. A diffusion screen is positioned behind the graphic screen in substantially parallel orientation a distance "D" from the graphic screen, as indicated in step 48. Per step 50, illumination is applied to a rearward side of the diffusion screen from one or more light sources, and in some instances may provide light generally uniformly to the diffusion screen 20, and in other instances the light source/sources may be positioned to provide light to selected areas of the diffusion screen. The photography subject 30 is positioned in front of the graphic screen, per step 52, and in step 54, photographic images are taken of the photography subject 30.

In use, the quantity of backlighting will depend on the number of lights used, the power output of the lights, a distance of the lights from the diffusion screen and the type and number of light modifiers used. Light output for commercially available studio strobes typically is in the range of between 500 Watts/seconds to 2000 Watts/seconds, and may be adjustable within this range. Flash duration for a strobe will typically be $\frac{1}{500}$ second to $\frac{1}{5000}$ second, depending on the type of strobe used. Continuously energized lights such as tungsten and fluorescent lights do not provide as much light output, and thus require slower shutter speeds or wider aperture. Where such constant lighting is used, the light output is typically between 900 equivalent Watts/second to about 2000 equivalent Watts/second. The range of light output from the combined diffusion panel and graphic panel will vary based upon factors as noted above. Where two 500 Watts/second power packs and strobes are used, the diffusion screen and graphics screen will restrict backlighting by approximately 1 to 2 f-stops of light as measured by a photographic light meter. Since light intensity doubles for every increase of 1 f-stop, and decreases by half for every decrease of one F-stop, we observe that 2 500 Watts/second strobes fired behind the diffusion screen will result in an output of between 250 and 500 equivalent Watts/seconds from the graphics screen. If a 2000 Watts/second powerpack and strobe is utilized as a backlight then the graphics screen will provide a light output of between 500 to 1000 equivalent watts/seconds. The photographer may use adjustable power settings on the studio strobes, the distance of the back light from the diffusion screen and the aperture and shutter speed settings of the camera to achieve optimal results.

The photography subject 30 is positioned or posed in front of the graphic screen and pictures are taken using camera 32. The diffusion screen 20 uniformly diffuses light from one or more light sources 12 positioned behind the diffusion screen and onto the graphic screen 14, which passes some of the diffused light through the sublimation dyes of the graphics image 16 and uniquely and unobviously results in strikingly realistic background images or backdrops. Graphics screen 14 is thus "backlit" by the uniform light from diffusion screen 20, which serves as a passive light source pumped by light source/sources 12. With a strikingly realistic, high resolution backdrop of the present invention, and a subject posed just in front of such a glowing backdrop, a picture taken by the camera convincingly shows the subject at the physical site printed on the graphics screen, rather than in front of a conventional graphics screen in a photo studio.

While a photographic graphics screen system is disclosed, Applicant's screen system also has other applications. For instance, a graphics screen system of the instant invention may be used as advertising and display media, and has further applications in cinematography and videography.

Having thus described my invention and the manner of its use, it should be apparent to those skilled in the relevant arts that incidental changes may be made thereto that fairly fall within the scope of the following appended claims, wherein I claim:

1. A system comprising:
   a backdrop screen assembly further comprising,
      a graphics screen having graphics on a front side thereof,
      a passive, diffuse light source positioned at a selected spacing from a rear of said graphics screen,
   one or more light sources positioned to pump said passive, diffuse light source,
   said passive, diffuse light source constructed of a sheet material that uniformly diffuses light from said one or more light sources across a width and breadth of said rear of said graphics screen, said graphics screen constructed of a material that passes said diffuse light to a front of said graphics screen, illuminating said graphics;
   wherein said passive light source is a diffusion screen at least similar in size as said graphics screen, said diffusion screen mounted at said selected spacing behind said graphics screen;
   further comprising at least one spacer member for maintaining said selected spacing between said graphics screen and said diffusion screen;
   wherein said spacer member further comprises an elongated spacing member at least as long as a width of said graphics screen and said diffusion screen, said spacing member being of uniform width, with a horizontal edge of said graphics screen disposed along a front side of said elongated member and a corresponding horizontal edge of said diffusion screen disposed along a rear side of said elongated member, said width of said elongated member corresponding to said selected spacing.

2. A system as set forth in claim 1 further comprising mounting a top said horizontal edge of said graphics screen along said front side of said elongated member and mounting a top said horizontal edge of said diffusion screen along said rear side of said elongated member to maintain said selected spacing between said graphics screen and said diffusion screen.

3. A system as set forth in claim 2 further comprising a second elongated spacing member of uniform width and at least as long as said graphics screen and said diffusion screen, and mounting a lower said horizontal edge of said graphics screen to a front side of said second elongated spacing member and mounting said diffusion screen to a rear side of said second elongated spacing member to maintain said selected spacing along said lower edge of said graphics screen and said diffusion screen.

4. A system as set forth in claim 3 wherein said graphics screen and said diffusion screen are attached together at their respective said upper horizontal edge and their respective said lower horizontal edge, with said elongated spacing member inserted in a loop between said upper horizontal edge of said graphics screen and said upper horizontal edge of said diffusion screen, and said second elongated spacing member inserted between a loop between said lower horizontal edge of said graphics screen and said diffusion screen.

5. A system as set forth in claim 4 wherein said elongated spacing member and said second elongated spacing member are each about 1 inch in diameter, for maintaining a said selected spacing of about 1 inch between said graphics screen and said diffusion screen.

6. A system as set forth in claim 4 wherein said elongated spacing member and said second elongated spacing member are mounted in vertical adjustable relation, for adjusting a tautness of said graphics screen and said diffusion screen.

7. A system comprising:
a backdrop screen assembly further comprising,
  a graphics screen having graphics on a front side thereof,
  a passive, diffuse light source positioned at a selected spacing from a rear of said graphics screen,
one or more light sources positioned to pump said passive, diffuse light source,
said passive, diffuse light source constructed of a sheet material that uniformly diffuses light from said one or more light sources across a width and breadth of said rear of said graphics screen, said graphics screen constructed of a material that passes said diffuse light to a front of said graphics screen, illuminating said graphics;
wherein said selected spacing is from about ¼ inch to about 2 feet;
wherein said graphics screen is supported by a first horizontal support member mounted between a first pair of screen stands, and said diffusion screen is supported behind said graphics screen by a second horizontal support member mounted between a second pair of screen stands.

8. A system comprising:
a backdrop screen assembly further comprising,
  a graphics screen having graphics on a front side thereof,
  a passive diffuse light source positioned at a selected spacing from a rear of said graphics screen,
one or more light sources positioned to pump said passive, diffuse light source,
said passive, diffuse light source constructed of a sheet material that uniformly diffuses light from said one or more light sources across a width and breadth of said rear of said graphics screen, said graphics screen constructed of a material that passes said diffuse light to a front of said graphics screen, illuminating said graphics wherein said passive light source is a diffusion screen at least similar in size as said graphics screen, said diffusion screen mounted at said selected spacing behind said graphics screen;
wherein said graphics screen and said diffusion screen are connected together by stitching.

9. A system comprising:
a backdrop screen assembly further comprising,
  a graphics screen having graphics on a front side thereof,
  a passive, diffuse light source positioned at a selected spacing from a rear of said graphics screen,
one or more light sources positioned to pump said passive, diffuse light source,
said passive, diffuse light source constructed of a sheet material that uniformly diffuses light from said one or more light sources across a width and breadth of said rear of said graphics screen, said graphics screen constructed of a material that passes said diffuse light to a front of said graphics screen, illuminating said graphics wherein said passive light source is a diffusion screen at least similar in size as said graphics screen, said diffusion screen mounted at said selected spacing behind said graphics screen;
wherein said graphics screen and said diffusion screen are constructed of a single contiguous sheet of material, with free ends of said contiguous sheet of material attached together.

10. A system comprising:
a backdrop screen assembly further comprising,
  a graphics screen having graphics on a front side thereof,
  a passive, diffuse light source positioned at a selected spacing from a rear of said graphics screen,
one or more light sources positioned to pump said passive, diffuse light source,
said passive, diffuse light source constructed of a sheet material that uniformly diffuses light from said one or more light sources across a width and breadth of said rear of said graphics screen, said graphics screen constructed of a material that passes said diffuse light to a front of said graphics screen, illuminating said graphics wherein said passive light source is a diffusion screen at least similar in size as said graphics screen, said diffusion screen mounted at said selected spacing behind said graphics screen;
wherein said graphics screen and said diffusion screen are constructed of material to restrict backlighting from said one or more light sources by about 1 to 2 F stops.

11. A system comprising:
a backdrop screen assembly further comprising,
  a graphics screen having graphics on a front side thereof,
  a passive, diffuse light source positioned at a selected spacing from a rear of said graphics screen,
one or more light sources positioned to pump said passive, diffuse light source,
said passive, diffuse light source constructed of a sheet material that uniformly diffuses light from said one or more light sources across a width and breadth of said rear of said graphics screen, said graphics screen constructed of a material that passes said diffuse light to a front of said graphics screen, illuminating said graphics wherein said passive light source is a diffusion screen at least similar in size as said graphics screen, said diffusion screen mounted at said selected spacing behind said graphics screen;
wherein with said one or more light sources adjusted to provide about 1000 watts/second as a strobe, said diffusion screen provides from about 250 to 500 equivalent watts/second evenly distributed from across the entire surface of said diffusion screen to said rear of said graphics screen.

12. A backdrop screen assembly comprising:
a graphics screen having graphics printed on a front side thereof using a dye sublimation printing process, said graphics screen constructed of a material that passes light,
a diffusion screen in spaced relation from a rear of said graphics screen, said diffusion screen constructed of a material that uniformly diffuses and passes light to a rear of said graphics screen,
one or more light sources positioned to direct light onto said diffusion screen;
wherein said graphics screen and said diffusion screen are constructed of the same material, and attached together at upper edges and lower edges thereof.

13. A system as set forth in claim 12 further comprising:
a first spacing member of uniform width and of a length at least that of said upper edges of said graphics screen and said diffusion screen,
a second spacing member of uniform width and of a length at least that of said of said lower edges of said graphics screen and said diffusion screen, said first spacing member inserted between said graphics screen and said diffusion screen at attached said upper edges thereof, and said second spacing member inserted between said graphics screen and said diffusion screen at attached said lower edges thereof, said upper spacing member and said lower spacing member establishing said spaced relation between said graphics screen and said diffusion screen.

14. A backdrop screen assembly comprising:

a graphics screen having graphics printed on a front side thereof using a dye sublimation printing process, said graphics screen constructed of a material that passes light, a diffusion screen in spaced relation from a rear of said graphics screen, said diffusion screen constructed of a material that uniformly diffuses and passes light to a rear of said graphics screen, one or more light sources positioned to direct light onto said diffusion screen;

wherein said graphics screen and said diffusion screen restrict light from said one or more light sources by between 1 and 2 F stops.

* * * * *